(12) United States Patent
Toda

(10) Patent No.: US 6,251,197 B1
(45) Date of Patent: Jun. 26, 2001

(54) ROLLING OR SLIDING PARTS

(75) Inventor: Kazutoshi Toda, Habikino (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/428,996

(22) Filed: Oct. 28, 1999

(30) Foreign Application Priority Data

Nov. 9, 1998 (JP) .................................................. 10-317887

(51) Int. Cl.$^7$ .............................. C23C 8/22; C21D 9/36; C21D 9/40

(52) U.S. Cl. .......................... 148/319; 148/906; 148/233; 148/662

(58) Field of Search .................................. 748/319, 104; 148/906, 206, 225, 233, 660, 662

(56) References Cited

U.S. PATENT DOCUMENTS

| | | | |
|---|---|---|---|
| 4,202,710 | * | 5/1980 | Naito et al. .......................... 148/16.5 |
| 5,084,116 | * | 1/1992 | Mitamura .............................. 148/319 |
| 5,336,338 | * | 8/1994 | Toda ..................................... 148/319 |
| 5,672,014 | * | 9/1997 | Okita et al. .......................... 384/492 |
| 6,149,734 | * | 11/2000 | Isogai et al. ......................... 148/233 |

* cited by examiner

*Primary Examiner*—Roy King
(74) *Attorney, Agent, or Firm*—Jacobson Holman, PLLC

(57) ABSTRACT

A rolling or sliding part is produced from a blank of steel material subjected to a heat treatment including carburization and thereby made to contain a spheroidal carbide precipitated and dispersed in a carburized layer matrix. The particle-to-particle distance of the spheroidal carbide is up to 15 μm in terms of the distance between the most proximate particles. The rolling or sliding part is suitable as antifriction bearing components, such bearing rings and rolling bodies, or as sliding bearing components, for use in soiled oil containing extraneous matter. The antifriction bearing comprising this part serves a lengthened rolling life in soiled oil and clean oil, and the sliding bearing incorporating the part is also given an extended life.

6 Claims, 3 Drawing Sheets

ROLLING OR SLIDING PARTS

BACKGROUND OF THE INVENTION

The present invention relates to rolling or sliding parts, and more particularly to rolling parts suitable as antifriction bearing components, such bearing rings and rolling bodies, or as sliding parts suited as sliding bearing components, for use in soiled oil containing extraneous matter.

For example for use in such antifriction bearings, the present applicant has already proposed an antifriction bearing part which comprises a steel containing 0.5 to 1.2 wt. % of C and 0.7 to 3.0 wt. % of Cr and is given a surface with a C content of 1.5 to 3.0 wt. % and a surface hardness of at least 63 in Rockwell C hardness by carburizing treatment, the bearing part having a carburized layer containing a precipitated fine spheroidal carbide in an amount of 15 to 80% in area ratio. The spheroidal carbide is up to 10 $\mu$m in diameter. The matrix of the carburized layer contains 0.6 to 0.7 wt. % of C (JP-A No. 41934/1995).

However, we have found that the conventional part described still remains to be improved in life for use in antifriction bearings which are subjected to conditions of ever-increasing severity recently.

DISCLOSURE OF THE INVENTION

Accordingly, we have conducted extensive research with various experiments and found that the rolling life is greatly influenced by the particle-to-particle distance of the spheroidal carbide of the carburized layer in rolling or sliding parts. This finding has matured to the present invention.

An object of the present invention is to overcome the foregoing problem and provide a rolling or sliding part having a longer life than the conventional parts.

The present invention provides a rolling or sliding part comprising a steel material subjected to a heat treatment including carburization and containing a spheroidal carbide precipitated and dispersed in a carburized layer matrix, the particle-to-particle distance of the spheroidal carbide being up to 15 $\mu$m in terms of the distance between the most proximate particles.

With the rolling or sliding part, the particle-to-particle distance of the spheroidal carbide is limited to not greater than 15 $\mu$m in terms of the distance between the most proximate particles because it has been substantiated by experiments that this results in a lengthened rolling life in soiled oil and clean oil.

In the case of the rolling or sliding part of the present invention, the particle-to-particle distance of the spheroidal carbide is up to 15 $\mu$m in terms of the distance between the most proximate particles, so that the antifriction bearing comprising this part serves a prolonged rolling life in soiled oil and clean oil. Further when incorporating this part, the sliding bearing has an extended life.

The rolling or sliding part of the invention is suitable as antifriction bearing components, such bearing rings and rolling bodies, or as sliding bearing components, for use in soiled oil containing extraneous matter.

DESCRIPTION OF THE PREFERRED EMBODIMENTS

The factor for giving the spheroidal carbide precipitated and dispersed in the carburized layer matrix of the rolling or sliding part a particle-to-particle distance of up to 15 $\mu$m in terms of the distance between the most proximate particles is thought to be involved in the alloy composition of the steel material to be used for making the part or in the conditions for the heat treatment including carburization, whereas research has yet to be made to clarify what influence the alloy composition or heat-treatment conditions produce on the particle-to-particle distance of the spheroidal carbide.

Examples of useful steel materials are known steels such as JIS SUJ2, JIS SCr420 and SAE 5120, and a steel comprising 0.15 to 0.45 wt. % of C, 1.2 to 1.6 wt. % of Cr, 0.35 to 0.55 wt. % of Si, 0.35 to 0.65 wt. % of Mn, and the balance Fe and inevitable impurities.

Useful for the heat treatment including carburization and to be conducted for a blank of rolling or sliding part prepared from such a steel material is, for example, a process comprising the first step of carburizing or carburizing and quenching, the second step of hardening to precipitate a fine spheroidal carbide in the resulting carburized layer, and the third step of high-concentration carburizing and quenching for forming a surface portion having a higher carbon concentration than the surface portion resulting from the first step. Preferably, the heating temperature of the third step is not higher than the heating temperature of the second step because if the heating temperature of the third step is higher than the heating temperature of the second step, the carbide precipitated by the second step is likely to partly dissolve in the matrix. Described more specifically, the process comprises the first step of heating the blank in a carburizing atmosphere containing 10 to 17 vol. % of $C_3H_8$ at a temperature of 930 to 950° C. for 3 to 5 hours, followed by oil quenching, the second step of heating the quenched blank at a temperature of 800 to 840° C. for 0.5 to 0.8 hour, followed by oil quenching, and the third step of heating the resulting blank in a carburizing atmosphere containing 10 to 17 vol. % of $C_3H_8$ at a temperature in the range of 790 to 840° C. and not higher than the heating temperature of the second step for 3 to 5 hours, followed by oil quenching. It is preferable to perform the third step by heating the blank in a carburizing atmosphere containing 10 to 17 vol. % of $C_3H_8$ at a temperature in the range of 790 to 820° C. and not higher than the heating temperature of the second step for 3 to 5 hours and thereafter heating the blank at an elevated temperature of 830 to 840° C. for 0.5 to 0.8 hour, followed by oil quenching. It is then possible to give the matrix an increased amount of carbide without producing coarser particles of carbide.

It is desired that the rolling or sliding part of the invention have a particle-to-particle distance of up to 10 $\mu$m in terms of the distance between the most proximate particles. In this case, the antifriction bearing comprising this part serves a further lengthened rolling life in soiled oil and clean oil, and the sliding bearing incorporating the part is given a further extended life.

Preferably the rolling or sliding part of the invention has a surface hardness of 58 to 67 in Rockwell C hardness (hereinafter referred to briefly as "HRC"). If less than 58 in HRC, the surface hardness is insufficient, rendering, for example, the antifriction bearing wherein the rolling part is used susceptible to surface indentations or flaws due to extraneous matter which will initiate spalling or separation and resulting in impaired abrasion resistance to shorten the life of the bearing, in the case where the bearing is used in soiled oil containing extraneous matter. If the hardness is over 67 in HRC, lower toughness will result. If less than 58 in HRC, the surface hardness is insufficient also in the case of the sliding part. The part will then be susceptible to surface indentations due to friction.

Further with the rolling or sliding part of the present invention, it is desired that the spheroidal carbide be up to 5 μm in mean particle size. If the mean particle size of the spheroidal carbide is over 5 μm, the amount of spheroidal carbide in excess of 5 μm in particle size will be about 80% of the whole amount of spheroidal carbide, consequently permitting stress concentration on the carbide portion exceeding 5 μm in particle size, and the part is likely to develop a break in this portion. Accordingly, the spheroidal carbide should be up to 5 μm, preferably up to 3 μm, in mean particle size. When the amount of spheroidal carbide up to 5 μm in particle size is less than 70%, the carbide in excess of 5 μm in particle size will be in an amount of at least 30% of the whole amount and will contain particles with a maximum size of 10 μm as the case may be, with the result that the portion of carbide exceeding 5 μm in size is subjected to stress concentration to develop a break. Accordingly, it is preferable that the amount of spheroidal carbide up to 5 μm in particle size be at least 70% of the whole amount of spheroidal carbide.

EXAMPLES

Examples 1–15

Figure 1:
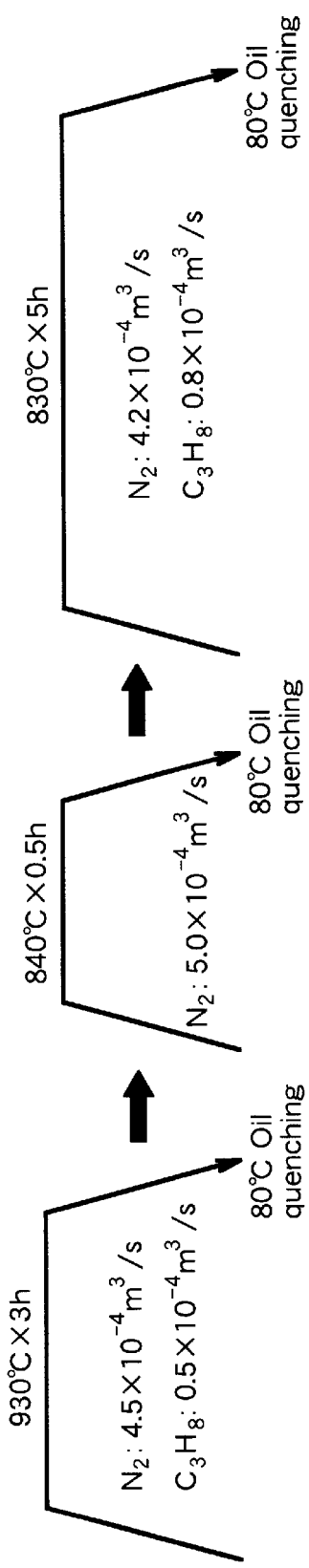
FIG. 1 is a diagram showing the conditions for heat treatment 1 conducted in some examples of the invention.
Figure 2:
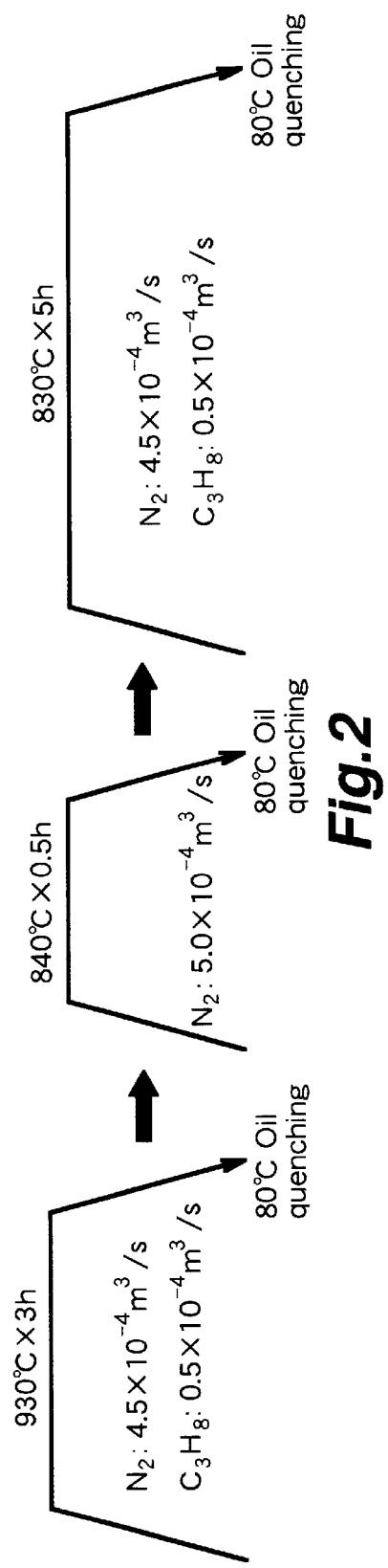
FIG. 2 is a diagram showing the conditions for heat treatment 2 conducted in some examples of the invention.

SAE 5120 (steel material A), JIS SUJ2 (steel material B) and a steel (steel material C) comprising 0.2 wt. % of C, 1.4 wt. % of Cr, 0.45 wt. % of Si, 0.55 wt. % of Mn and the balance Fe and inevitable impurities were used for preparing 15 sets of blanks of bearing rings and blanks of balls for thrust ball bearings. The blanks for some of these sets were heat-treated under the conditions shown in FIG. 1 (heat treatment 1), and those for the other sets were heat-treated under the conditions shown in FIG. 2 (heat treatment 2). The blanks subjected to the heat treatment 1 or 2 were subsequently heated at 160° C. for 2 hours for tempering and thereafter abraded over the surface in varying amounts to obtain 15 sets of bearing rings and balls which were different in the properties of the surface portion. These sets were assembled into 15 thrust ball bearings. Incidentally, the tempering step is not illustrated since this step is generally performed after hardening to improve the toughness of the blank.

The heat treatment 1, which was conducted using a fluidized-bed furnace, comprises the first step of carburizing and quenching, i.e., of heating the blank at 930° C. for 3 hours while supplying $N_2$ gas serving as a fluidizing gas at a flow rate of $4.5 \times 10^{-4}$ m$^3$/s and supplying $C_3H_8$ gas at a flow rate of $0.5 \times 10^{-4}$ m$^3$/s (the $C_3H_8$ concentration of the atmosphere: 10 vol. %), and thereafter quenching the blank in oil at 800 C, the second step of hardening by heating the blank at 840° C. for 0.5 hour while supplying $N_2$ gas serving as a fluidizing gas at a flow rate of $5.0 \times 10^{-4}$ m$^3$/s, and thereafter quenching the blank in oil at 80° C., and the third step of high-concentration carburizing and quenching, i.e., of heating the blank at 830° C. for 5 hours while supplying $N_2$ gas serving as a fluidizing gas at a flow rate of $4.2 \times 10^{-4}$ m$^3$/s and supplying $C_3H_8$ gas at a flow rate of $0.8 \times 10^{-4}$ m$^3$/s (the $C_3H_8$ concentration of the atmosphere: 16 vol. %), and thereafter quenching the blank in oil at 80° C.

The heat treatment 2, which was conducted using a fluidized-bed furnace, comprises the first step of carburizing and quenching, i.e., of heating the blank at 930° C. for 3 hours while supplying $N_2$ gas serving as a fluidizing gas at a flow rate of $4.5 \times 10^{-4}$ m$^3$/s and supplying $C_3H_8$ gas at a flow rate of $0.5 \times 10^{-4}$ m$^3$/s (the $C_3H_8$ concentration of the atmosphere: 10 vol. %), and thereafter quenching the blank in oil at 80° C., the second step of hardening by heating the blank at 840° C. for 0.5 hour while supplying $N_2$ gas serving as a fluidizing gas at a flow rate of $5.0 \times 10^{-4}$ m$^3$/s, and thereafter quenching the blank in oil at 80° C., and the third step of high-concentration carburizing and quenching, i.e., of heating the blank at 830° C. for 5 hours while supplying $N_2$ gas serving as a fluidizing gas at a flow rate of $4.5 \times 10^{-4}$ m$^3$/s and supplying $C_3H_8$ gas at a flow rate of $0.5 \times 10^{-4}$ m$^3$/s (the $C_3H_8$ concentration of the atmosphere: 10 vol. %), and thereafter quenching the blank in oil at 80°.

Comparative Examples 1–6

Figure 3:
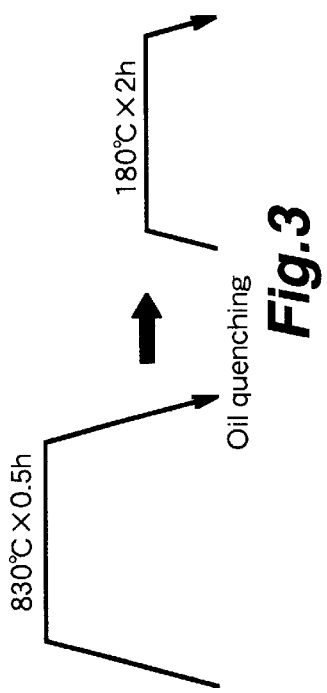
FIG. 3 is a diagram showing the conditions for heat treatment 3 conducted in some comparative examples.
Figure 4:
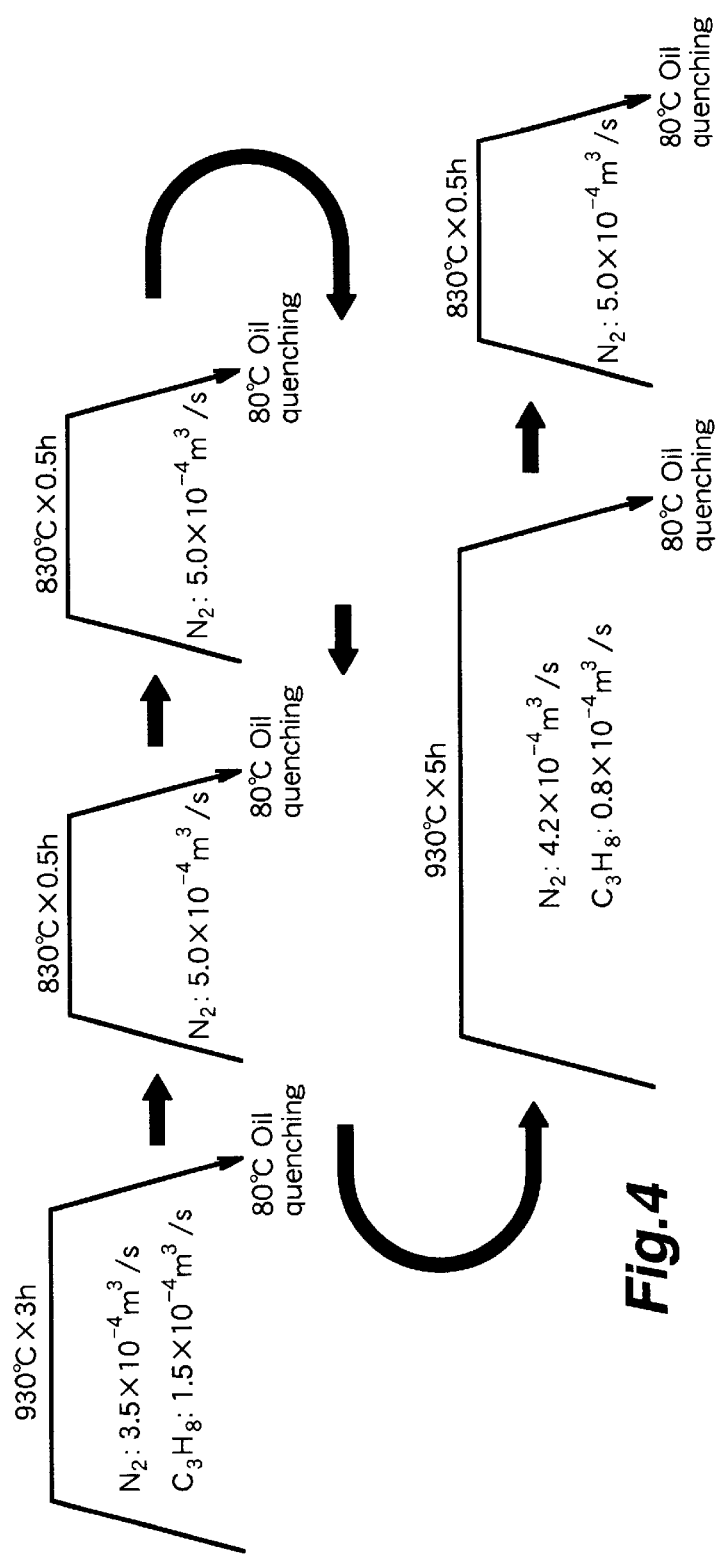
FIG. 4 is a diagram showing the conditions for heat treatment 4 conducted in some comparative examples.

SAE 5120 (steel material A) and JIS SUJ2 (steel material B) were used for preparing 6 sets of blanks of bearing rings and blanks of balls for thrust ball bearings. The blanks for some of these sets were heat-treated under the conditions shown in FIG. 3 (heat treatment 3), and those for the other sets were heat-treated under the conditions shown in FIG. 4 (heat treatment 4). The blanks subjected to the heat treatment 4 were subsequently heated at 160° C. for 2 hours for tempering. The blanks were thereafter abraded over the surface in varying amounts to obtain 6 sets of bearing rings and balls which were different in the properties of the surface portion. These sets were assembled into 6 thrust ball bearings.

The heat-treatment 3 comprises the first step of hardening by heating the blank at 830° C. for 0.5 hour and thereafter quenching the blank in oil, and the second step of tempering by heating the blank at 180° C. for 2 hours.

The heat treatment 4, which was conducted using a fluidized-bed furnace, comprises the first step of carburizing and quenching the blank, i.e., of heating the blank at 930° C. for 3 hours while supplying $N_2$ gas serving as a fluidizing gas at a flow rate of $3.5 \times 10^{-4}$ m$^3$/s and supplying $C_3H_8$ gas at a flow rate of $1.5 \times 10^{-4}$ m$^3$/s (the $C_3H_8$ concentration of the atmosphere: 30 vol. %), and thereafter quenching the blank in oil at 80° C., the second step of hardening by heating the blank at 830° C. for 0.5 hour while supplying $N_2$ gas serving as a fluidizing gas at a flow rate of $5.0 \times 10^{-4}$ m$^3$/s, and thereafter quenching the blank in oil at 80° C., the third step of hardening by heating the blank at 830° C. for 0.5 hour while supplying $N_2$ gas serving as a fluidizing gas at a flow rate of $5.0 \times 10^{-4}$ m$^3$/s, and thereafter quenching the blank in oil at 80° C., the fourth step of high-concentration carburizing and quenching, i.e., of heating the blank at 930° C. for 5 hours while supplying $N_2$ gas serving as a fluidizing gas at a flow rate of $4.2 \times 10^{-4}$ m$^3$/s and supplying $C_3H_8$ gas at a flow rate of $0.8 \times 10^{-4}$ m$^3$/s (the $C_3H_8$ concentration of the atmosphere: 16 vol. %), and thereafter quenching the blank in oil at 80° C., and the fifth step of hardening by heating the blank at 830° C. for 0.5 hour while supplying $N_2$ gas serving as a fluidizing gas at a flow rate of $5.0 \times 10^{-4}$ m$^3$/s, and thereafter quenching the blank in oil at 80° C. Incidentally, the tempering step to be performed after the heat treatment 4 is not illustrated since this step is generally performed after hardening to improve the toughness of the blank.

Table 1 shows the properties of the thrust ball bearing rings and balls of Examples 1 to 15 and Comparative Examples 1 to 6, i.e., the particle-to-particle distance (distance between the most proximate particles) of the spheroidal carbide of the carburized layer (listed as "particle distance" in Table 1), surface hardness (HRC) of the surface portion, and the mean particle size of the spheroidal carbide of the carburized layer.

The mean particle size of the spheroidal carbide was determined by corroding the race of the sample directly with a picral solution for a predetermined period of time, observing the corroded surface at a magnification of X3000 using EPMA to measure the mean particle size of the carbide by the image analysis of ten fields and calculating the average value of the measurements. The particle-to-particle distance of the carbide was determined by corroding the race of the sample directly with a picral solution for a predetermined period of time, observing the corroded surface at a magnification of X3000 using EPMA to measure the mean particle size of the carbide and the number of particles of thereof by the image analysis of ten fields, calculating the respective average values of the measurements and calculating the distance from the known expression using the average values. The sample was thereafter lapped with alumina to remove the surface layer corroded with the picral solution and obtain a center line average height Ra of up to 0.05 $\mu$m.

TABLE 1

| | Steel mat. | Heat treatment | Amount of abrasion ($\mu$m) | Surface hardness HRC | Mean particle size ($\mu$m) | Particle distance ($\mu$m) | Life ($\times 10^6$ cycles) |
|---|---|---|---|---|---|---|---|
| Ex. | | | | | | | |
| 1 | A | 1 | 50 | 65.9 | 2.47 | 8.35 | 5.55 |
| 2 | A | 2 | 50 | 65.5 | 1.92 | 8.50 | 6.08 |
| 3 | A | 2 | 70 | 59.5 | 3.15 | 9.54 | 5 |
| 4 | A | 1 | 70 | 59.1 | 3.83 | 8.29 | 4.9 |
| 5 | A | 1 | 50 | 65.2 | 3.44 | 8.70 | 5.6 |
| 6 | A | 1 | 70 | 65.6 | 3.07 | 8.27 | 4.86 |
| 7 | B | 1 | 100 | 63.5 | 2.45 | 8.43 | 5.26 |
| 8 | B | 1 | 120 | 58.0 | 2.32 | 11.9 | 4.7 |
| 9 | B | 2 | 120 | 60.2 | 2.42 | 8.98 | 5.02 |
| 10 | C | 1 | 50 | 65.3 | 0.52 | 2.14 | 11.7 |
| 11 | C | 2 | 50 | 65.2 | 0.40 | 3.16 | 10.9 |
| 12 | A | 2 | 50 | 65.3 | 1.50 | 8.50 | 50 |
| 13 | B | 1 | 120 | 65.1 | 2.01 | 11.9 | 29.2 |
| 14 | C | 1 | 50 | 67.0 | 0.50 | 2.14 | 87.5 |
| 15 | C | 2 | 50 | 66.1 | 0.35 | 3.16 | 83.3 |
| C.Ex. | | | | | | | |
| 1 | A | 4 | 150 | 57.5 | 1.31 | 17 | 2.1 |
| 2 | A | 4 | 150 | 59.3 | 1.20 | 20 | 2.2 |
| 3 | B | 3 | 150 | 57.0 | 0.91 | 23 | 2 |
| 4 | A | 4 | 150 | 66.0 | 0.75 | 17 | 11 |
| 5 | A | 4 | 150 | 65.2 | 2.10 | 20 | 8.2 |
| 6 | B | 3 | 150 | 62.1 | 1.97 | 23 | 8 |

Evaluation Test 1

The ball bearings of Examples 1 to 11 and Comparative Examples 1 to 3 were subjected to a life test in a soiled oil containing extraneous matter. The ball bearing was immersed in #60 spindle oil containing 0.12 wt. % of a high-speed tool steel powder, 27 $\mu$m in mean particle size, 50 $\mu$m in maximum particle size and HRC 65 in surface hardness, and tested for life under a thrust load of 3.92 kN (maximum contact stress Pmax=5.24 GPa), at a speed of rotation of 1200 rpm (stress application frequency: 30 Hz) using a thrust-type tester. A vibrometer was connected to the tester so that when the vibration value increased to twice the initial value in the event of a fault, such as spalling, occurring during testing, the tester was automatically stopped. The oil was not filtered or replenished during testing, but the used oil was replaced by a specified amount of fresh oil every time the test was conducted. Table 1 also shows the life of the ball bearings of Examples 1 to 11 and Comparative Examples 1 to 3.

Figure 5:
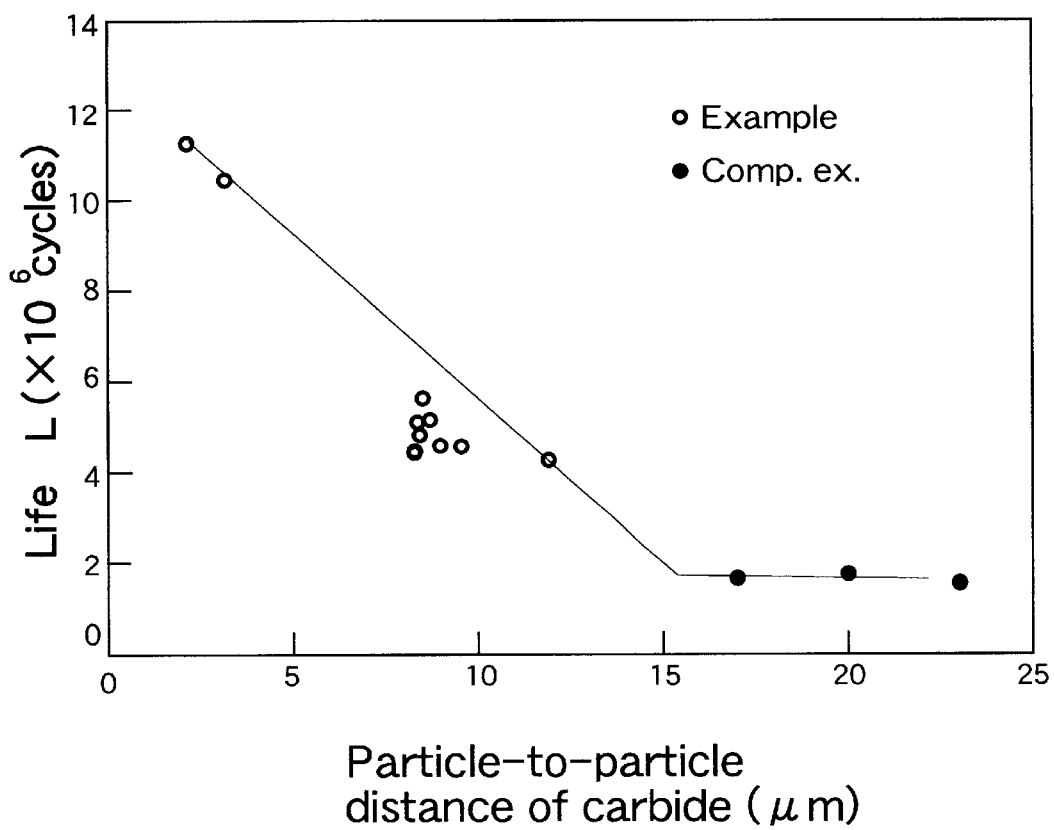
FIG. 5 is a graph showing the relationship between the particle-to-particle distance of carbide and the rolling life as established for the parts prepared in Examples 1 to 11 and Comparative Examples 1 to 3.

The relationship between the particle-to-particle distance of the spheroidal carbide of the carburized layer and the rolling life L was determined for the bearing rings and balls of Examples 1 to 11 and Comparative Examples 1 to 3. FIG. 5 showing the results indicates that the smaller the particle-to-particle distance of the carbide in the range of up to 15 $\mu$m, the longer the life L. In the case of Comparative Examples 1 to 3 wherein the distance is greater than 15 $\mu$m, the life L is up to half of that of Examples 1 to 11.

Evaluation Test 2

The ball bearings of Examples 12 to 15 and Comparative Examples 4 to 6 were subjected to a life test in a clean oil. The ball bearing was immersed in clean #60 spindle oil free from extraneous matter and tested under the same conditions as in Evaluation Test 1. Table 1 also shows the life of the ball bearings of Examples 12 to 15 and Comparative Examples 4 to 6.

Figure 6:
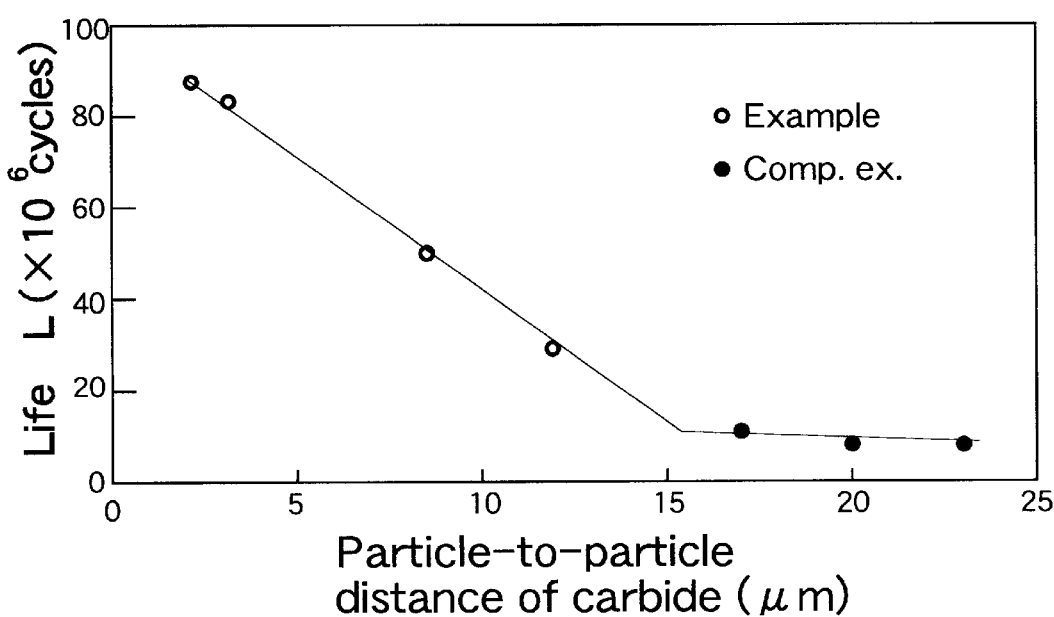
FIG. 6 is a graph showing the relationship between the particle-to-particle distance of carbide and the rolling life as established for the parts prepared in Examples 12 to 15 and Comparative Examples 4 to 6.

The relationship between the particle-to-particle distance of the spheroidal carbide of the carburized layer and the rolling life L was determined for the bearing rings and balls of Examples 12 to 15 and Comparative Examples 4 to 6. FIG. 6 showing the results indicates that the smaller the particle-to-particle distance of the carbide in the range of up to 15 $\mu$m, the longer the life L. In the case of Comparative Examples 4 to 6 wherein the distance is greater than 15 $\mu$m, the life L is up to half of that of Examples 12 to 15.

The foregoing results reveal that the parts wherein the particle-to-particle distance of the carbide of the carburized layer is up to 15 $\mu$m serve a prolonged rolling life L in both soiled oil and clean oil.

Although rolling parts of the invention for use in antifriction bearings have been described with reference to the foregoing examples, the invention is not limited to antifriction bearing parts but is applicable also to other rolling parts and sliding parts such as those of sliding bearings. The advantage of improved life is available also in these applications.

What is claimed is:

1. A rolling or sliding part comprising a blank of rolling or sliding part prepared from a steel material, produced by conducting a heat treatment comprising the first step of carburizing and quenching to create a carburized layer on said blank, the second step of hardening to precipitate a spheroidal carbide in the carburized layer, and the third step of high-concentration carburizing and quenching for forming a surface portion having a higher carbon concentration than the surface portion resulting from the first step, the particle-to-particle distance of the spheroidal carbide being up to 15 $\mu$m in terms of the distance between the most proximate particles.

2. A rolling or sliding part according to claim 1 wherein a heating temperature of the third step is not higher than a heating temperature of the second step.

3. A rolling or sliding part according to claim 1 wherein the first step comprises heating the blank in a carburizing atmosphere at a temperature of 930 to 950° C. for three to five hours, followed by oil quenching, and the third step comprises heating the resulting blank in a carburizing atmosphere at a temperature in the range of 790 to 840° C. and not higher than the heating temperature of the second step for three to five hours, followed by oil quenching.

4. A rolling or sliding part according to claim 1 wherein the first step comprises heating the blank in a carburizing atmosphere at a temperature of 930 to 950° C. for three to five hours, followed by oil quenching, the second step comprises heating the quenched blank at a temperature of 800 to 840° C. for 0.5 to 0.8 hours, followed by oil quenching, and the third step comprises heating the resulting blank in a carburizing atmosphere at a temperature in the range of 790 to 840° C. and not higher than the heating temperature of the second step for three to five hours and thereafter heating the blank at an elevated temperature of 830 to 840° C. for 0.5 to 0.8 hours, followed by oil quenching.

5. A rolling or sliding part according to claim 1 which has a surface hardness of 58 to 67 in Rockwell C hardness.

6. A rolling or sliding part according to claim 1 wherein the spheroidal carbide is up to 5μm in mean particle size.

* * * * *